Figure 1:
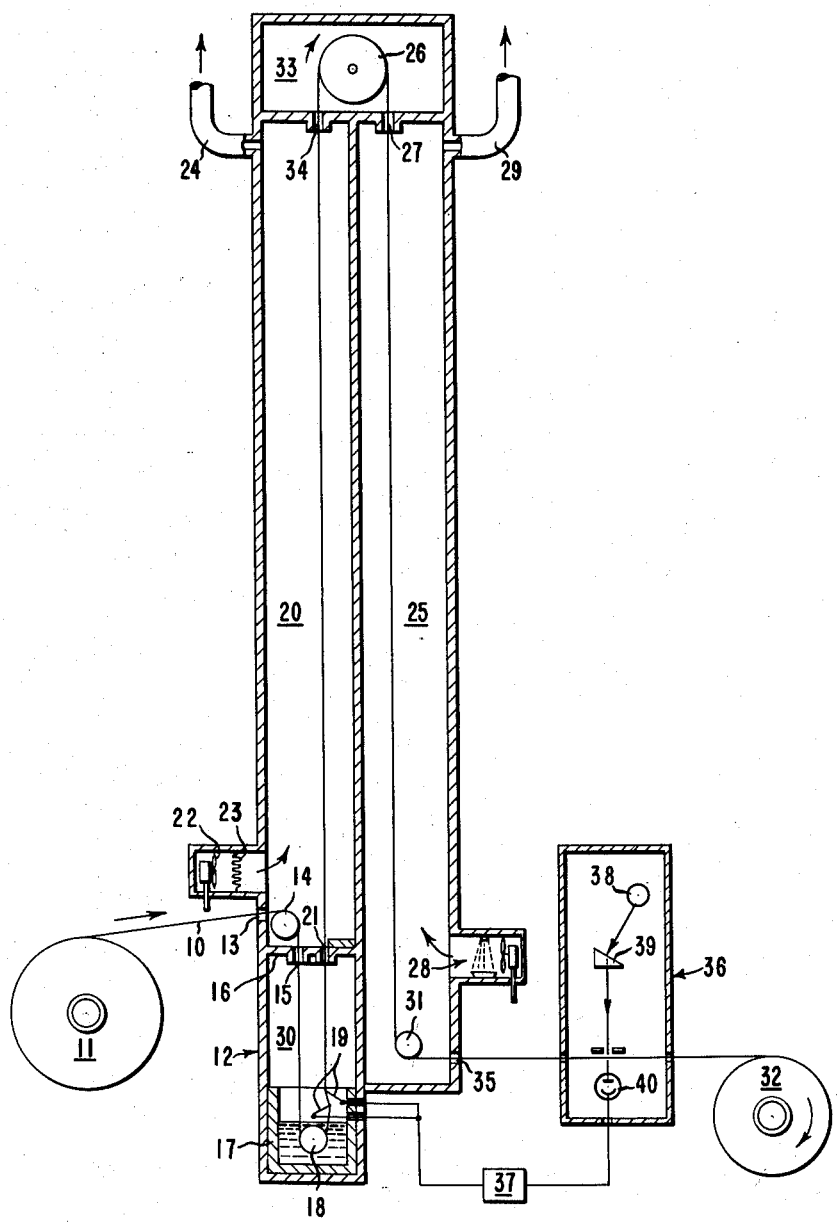

Feb. 5, 1963 E. R. COVINGTON 3,076,723
COATING WEIGHT DETERMINATION BY MEANS OF ULTRAVIOLET LIGHT
Filed May 26, 1958 2 Sheets-Sheet 1

INVENTOR
EDWARD ROYALS COVINGTON

BY *Herbert M. Wolfson*
ATTORNEY

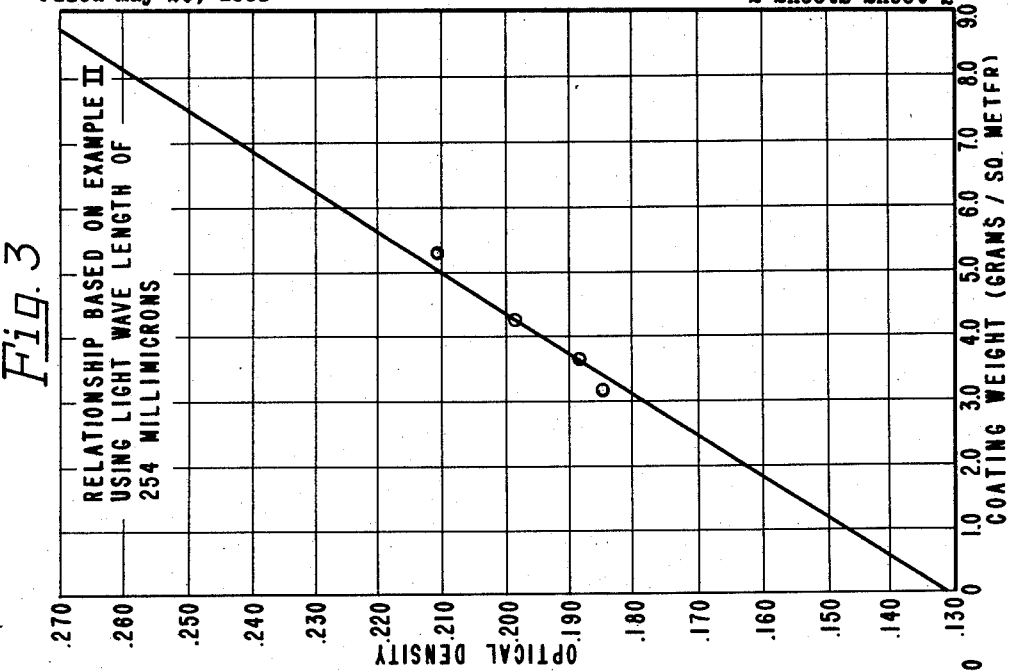
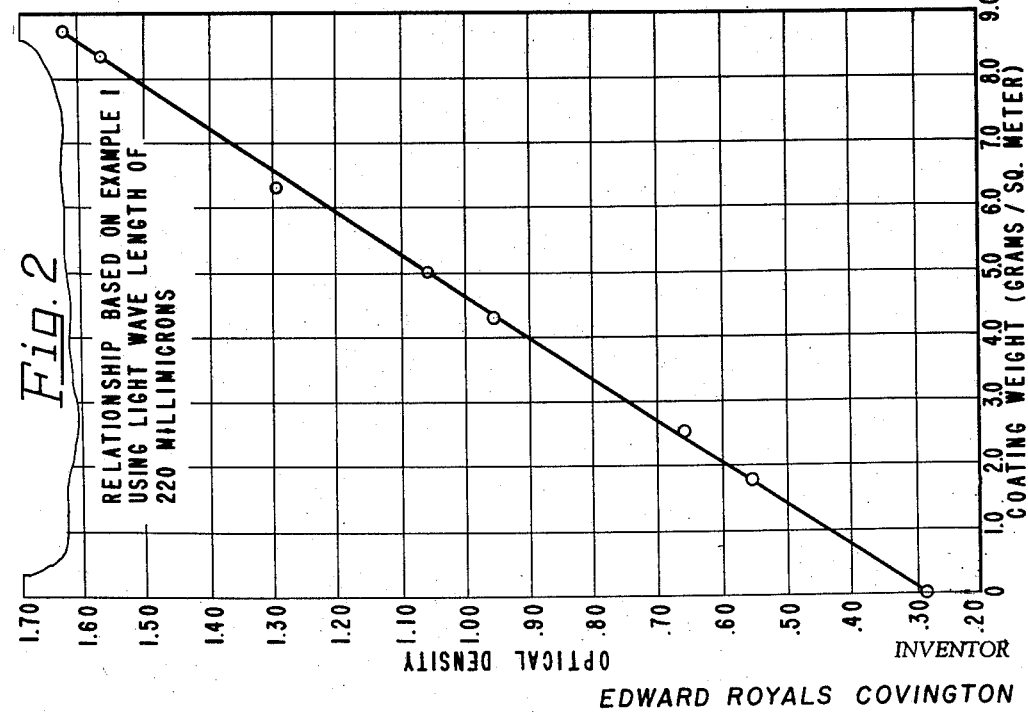

3,076,723
COATING WEIGHT DETERMINATION BY MEANS OF ULTRAVIOLET LIGHT
Edward Royals Covington, Madison, Tenn., assignor to E. I. du Pont de Nemours and Company, Wilmington, Del., a corporation of Delaware
Filed May 26, 1958, Ser. No. 737,746
10 Claims. (Cl. 117—93.31)

This invention relates to the coating of non-fibrous, organic sheet materials. More particularly, the invention relates to a rapid and efficient method for measuring the weight or thickness of coatings applied to webs or sheets of regenerated cellulose.

In the present specification the terms "coating weight" and "coating thickness" will be used interchangeably. It should be understood that those skilled in the art have heretofore usually measured the coating weight in grams per square meter, which they then can, if desired, translate into a thickness measurement.

In the coating of base films such as regenerated cellulose film with polymeric dispersions, the base film is first led through a bath containing a dispersion of the polymer; after which, the coated film is doctored as excess composition is removed, made smooth and then dried. The properties of the resulting film depend to a great extent on the thickness or weight of the coating on the film. The uniformity of these properties across the width of the film depends upon the coating profile on the base film.

Heretofore, the measurement of coating weight has involved a tedious, laborious procedure. Samples of the coated film were taken periodically. The coating was either stripped or dissolved from a measured, preweighed area of the film. Weighing the removed coating or reweighing the film after removing the coating provided the coating weight. Coating profiles were obtained by multiplying the foregoing procedure several-fold. The shortcomings of the method, particularly in a continuous operation, are imediately apparent. By the time one learns that the coating weight is too low or too high or that the profile is non-uniform and that an adjustment or a repair in the apparatus is necessary, thousands of feet (at running rates of 100 yards/minute and higher) of coated film may have been run and wasted.

The object of the present invention is a rapid, accurate method for measuring coating thickness of polymeric coatings on base films, particularly on regenerated cellulose films. Another object of the present invention is a measuring method that is easily adapted to a continuous operation and that does not interfere with a continuous coating process. Still another object is to control the coating thickness during a continuous coating process. Other objects, as well as means and methods for attaining the various objects, will be apparent from the following description and the accompanying illustrations.

In general, the objects are accomplished by uniformly coating a base film with a coating composition comprising a polymeric dispersion and a measured amount, preferably at least 0.1%, based on the weight of the polymer, of at least one compound selected from the group consisting of alkali metal and ammonium salts of sulfonic acids of aromatic compounds and alkali metal and ammonium salts of sulfonic acids of condensed aromatic compounds; thereafter, subjecting the coated film to a beam of ultraviolet light having a wave length of 220–400 millimicrons, preferably 220-270 millimicrons, and measuring the percent of the beam of ultraviolet light transmitted through the coated film.

Specifically, the invention has been found to apply to coating regenerated cellulose film with an aqueous dispersion containing a copolymer obtained from at least 80% vinylidene chloride with 3–20% of at least one other polymerizable mono-olefinic monomer copolymerizable with vinylidene chloride, the dispersion also containing at least one of the aforementioned alkali metal and ammonium salts as dispersing agents. It has been discovered that these dispersing agents, particularly condensed sodium naphthalene sulfonate and sodium alkyl benzene sulfonate absorb substantial amounts of ultraviolet light in the range of 220–400 millimicrons compared to the amounts absorbed by the vinylidene chloride copolymer compositions or by the transparent regenerated cellulose base film. Within this range, particularly between 220 and 270 millimicrons, the use of these dispersing agents provides a substantially straight line relationship between the percent light transmitted and the amount of the compound present. Therefore, by uniformly distributing a measured amount, at least about 0.1% (based on the weight of the polymer in the coating composition), of these ultraviolet light absorbent compounds in the coating composition, a measurement of the percent light transmitted provides an accurate determination of the thickness of the coating composition on the base film.

FIGURE 1 is a schematized side elevation of an apparatus using the present invention to control coating thickness automatically during the course of a continuous operation; and FIGURES 2 and 3 are curves showing the relationship between optical density, which is defined as the negative logarithm of $$\frac{\text{Percent light transmitted}}{100}$$

and coating weight in grams/square meter when using light at a wave length of 220 millimicrons and 254 millimicrons, respectively, and when using 2.9% and 2.4%, respectively, based on the weight of polymer in the coating composition, of dispersant ultraviolet light absorbent compounds.

In the embodiment shown in FIGURE 1, uncoated regenerated cellulose film 10, the so-called base film, is unwound from the roll 11 and enters the coating tower 12 through an opening 13. It will be noted that the film enters at the lower portion of the dryer section 20 of the coating tower, although this is not essential to the present invention. Here the film receives preliminary heating by the circulating hot dry air. The dry air is heated by heater 23 and circulated through this section by means of blower 22.

The film passes over roll 14 and enters the coating section 30 of the tower through the slot 15. The film next passes into the dip tank 17; around roll 18 and upwardly between doctor knives 19. The dip tank 17 contains the coating composition which in the present invention is preferably an aqueous dispersion of a copolymer prepared from at least 80% vinylidene chloride and also containing primary dispersing agents and secondary dispersing agents.

To prevent premature gelation of the coating composition on the surface of the film, doctor knives 19 should be located close to the surface of the coating bath in dip tank 17. The gap between the knife blades should be about 1½ inches with the edges overlapping slightly. The overlap is adjusted in a manner to be described subsequently to provide the desired coating thickness. As an alternative to doctor knives, doctor rolls may be used in a similar manner. After passing between the doctor knives 19 where excess coating is removed from the film surface and the coating remaining on the film is made smooth, the film passes through an adjustable slot 21 into the dryer section 20. As discussed previously, this air serves to dry the coated film by carrying the moisture vapor evaporated from the coating through the opening 24.

After being dried in the dryer section, the coated film is led over roll 26 in the section labeled 33 through the slot 27 into the conditioning or humidifying section 25 of the coating tower. In the conditioning section a controlled amount of moisture is applied to the coated film. This is accomplished by circulating moist air into the section at 28 and out at 29. The conditioned coated film then passes under roll 31 and out of the coating tower through opening 35 to be collected on roll 32. However, prior to collection of the film on roll 32, the film is subjected to a beam of ultraviolet light at station 36, station 36 comprising a spectrophotometer.

The spectrophotometer consists essentially of a light source 38, a dispersing element (a quartz prism) 39, means for selecting the desired wave length of light, 220–400 millimicrons in the apparatus of the present invention, and a detecting device (a photoelectric tube) 40. The instrument is designed so that it can be set to 100% transmission with no film in the light beam. Thus, the amount of current emitted by the photoelectric tube is a direct measure of the percent transmission of light through the coated film. The lower the percent transmission, the greater the absorption of light by the coated film and hence, the greater the thickness of the coating on the film. The current emitted by the photoelectric tube at station 36 may be used to provide a continuous record of the coating thickness or it may be amplified and used to maintain the setting on the doctor knives 19 through transducer means such as a servomechanism shown diagrammatically at 37.

The spectrophotometer may be mounted on a transverse mechanism, not shown, in order to provide measurements of the thickness across the width of the film continuously, i.e., the coating profile. Although only a single servomechanism is shown in the schematic illustration, it is obvious that several such mechanisms can be used to adjust the coating thickness as determined by the setting of the doctor knives at any point along the width of the film. It is also apparent that the spectrophotometer may be used at any stage subsequent to the coating operation to measure coating thickness. It may be used in any of sections 30, 20, 33 or 25 of the tower. For convenience, coating thickness is determined in the illustrated embodiment after the coated film leaves the coating tower.

The invention has been illustrated with certain ultraviolet light-absorbing, dispersing agents as used in vinylidene chloride coating dispersions for coating regenerated cellulose film. However, it will be apparent that other ultraviolet light-absorbing compounds may be found useful, perhaps with different polymeric coating compositions and perhaps with different base films, to provide means for measuring coating thickness. The following criteria are suggested as important:

(1) The compound must not affect the coating composition or the base film adversely and, preferably, should serve some useful purpose such as a primary dispersing agent, secondary dispersing or stabilizing agent, etc.

(2) The compound should absorb at least as much light, but preferably, substantially more light at some particular wave length or within a range of wave lengths than the sum of the light absorbed by the remainder of the ingredients involved—the base film and the other compounds of the coating composition.

(3) The amount of light absorbed by the compound should vary substantially directly with the amount of the compound present.

More specifically, the base film should absorb less than about 50% of light of the specified wave length. Thus, at wave lengths of 220–400 it has been found that the following base films are ceprable: regenerated cellulose, polyvinyl chloride, polyethylene, saran (vinylidene chloride copolymer), polyvinyl fluoride and acrylic polymers (polymerized alkyl acrylates). Within the same wave length range, dispersions of polymers containing at least 80% vinylidene chloride with 3–20% of at least one other polymerizable mono-olefinic monomer copolymerizable with vinylidene chloride have been found most useful. As the other copolymerizable monomer, one or more of the following may be used: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalamide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycodyl ether and other unsaturated aliphatic ethers described in U.S. Patent 2,160,943.

These compounds may be described as vinyl or vinylidene compounds having a single "$CH_2=C<$" group. The most useful ones fall within the general formula

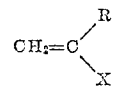

where R may be hydrogen, a halogen or a saturated aliphatic radical and X is selected from one of the following groups: —Cl, —Br, —F, —CN, —C$_6$H$_5$, —COOH,

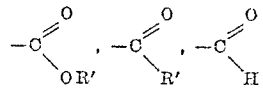

—OC$_6$H$_5$, —CONH$_2$, —CONH—R', and —CONR'$_2$, in which R' is alkyl.

The dispersant compound itself should absorb at least 10% of the light beamed on a film coated with a composition containing the compound but not more than about 90% of the aforementioned light. The latter figure (about 90%) should be such as to provide a total light absorption when added to that of the base film, that of the polymeric component and the other components in the coating composition of less than 100%. For purposes of the present invention, sodium salts of sulfonic acids of aromatic or condensed aromatic compounds (i.e., alkyl benzenes and alkyl naphthalenes) have been found most useful. The quantities of these dispersing compounds most useful in the present invention have been found to range from about 0.1% to about 6.0% (based on the weight of the polymer in the polymeric coating composition). The lower portion of this percentage range is useful when wave lengths at the lower portion of the 220–400 millimicron range are used; and the higher percentages are preferred at the upper portion of the wave length range. Thus, for "Daxad" 11, a sodium salt of a condensed aromatic sulfonic acid, and Alkanol B, a sodium salt of an alkyl naphthalene sulfonic acid, the most useful range may be found from 0.1% to about 2.5%; while for Santomerse 3, a sodium salt of an alkyl benzene sulfonate, a range of about 1% to about 6% has proved useful. Derivatives of anthracene, phenanthrene and other highly condensed aromatic compounds similar to those of benzene and naphthalene, described above, are also useful. The sulfonic acid grounds of these compounds tend to increase the ultraviolet light absorption and to make the compounds water soluble.

The important aspects of the present invention will be more apparent by referring to the following examples.

EXAMPLE I

A coating composition was prepared by adding a primary dispersing agent, vinylidene chloride, methyl acrylate, acrylonitrile, allyl glycidyl ether, methacrylic acid and water to a vessel fitted with a reflux condenser. The primary dispersing agent was composed of equal amounts of "Duponol" WAQ,[1] "Duponol" LS Paste [2] and "Sulframin" ABN.[3] After stirring this mixture to disperse the ingredients, a solution of ammonium persulfate and metasodium bisulfite in water was added to catalyze the reaction. The mixture refluxed, maintaining the temperature between 32° C. and 36° C. as polymerization progressed. The mixture was stirred until refluxing ceased, thereby indicating the completion of copolymerization. Upon completion of the reaction, a solution of "Duponol" WAQ, "Sulframin" ABN and "Daxad" 11 [4] was added as a secondary dispersing agent to stabilize the copolymer against coagulation. The resulting dispersion was cooled and discharged through a filter. The polymeric dispersion was composed of 50% solids. The ingredients used in the preparation are summarized below:

|  | Parts |
|---|---|
| Primary dispersing agent | 2 |
| "Duponol" WAQ | 0.66 |
| "Duponol" LSP | 0.66 |
| "Sulframin" ABN | 0.66 |
| Vinylidene chloride | 96 |
| Methyl acrylate | 2 |
| Acrylonitrile | 2 |
| Allyl glycidyl ether | 1 |
| Methacrylic acid | 1 |
| Catalyzing agent | 0.6 |
| Ammonium persulfate | 0.4 |
| Meta-sodium bisulfite | 0.2 |
| Secondary dispersing agent | 3.3 |
| "Duponol" WAQ | 1.0 |
| "Daxad" 11 | 0.3 |
| "Sulframin" ABN | 2.0 |
| Water | 108 |

Thus, a total of 2.9%, based on the weight of polymer in the coating composition, of dispersant-ultraviolet light absorbent compound was used; 0.3% "Daxad" 11 and 2.6% "Sulframin" ABN.

The dispersion was then coated on a regenerated cellulose film approximately 0.0012" thick by passing the film through a coating bath containing the dispersion. Excess dispersion was doctored from the film surface and the coated film was dried. Similarly, portions of the above dispersion were diluted to lower solids contents and applied to other samples of regenerated cellulose film to provide coating weights varying from 1.8 grams/square meter to 8.8 grams/square meter.

Optical densities, calculated as the negative logarithm of $$\frac{\text{Percent light transmitted}}{100}$$

were obtained for each coated film sample by measuring light transmission through the sample with the Beckman DU spectrophotometer using light at a wave length of 220 millimicrons. The actual coating weights were determined by stripping the coating from a measured area, drying and then weighing the coating. The values are presented in Table 1 and plotted in FIGURE 2. It will be observed that a plot of optical density vs. actual coating weight provides a straight line.

[1] Sodium lauryl sulfate.
[2] Sodium oleyl sulfate.
[3] Sodium dodecyl benzene sulfonate.
[4] Sodium salt of naphthalene sulfonic acid condensed with formaldehyde.

Table 1

VALUES SERVING AS A BASIS FOR FIGURE 2

| Light Transmitted (percent) | Optical Density $\left(-\log \frac{L.T.}{100}\right)$ | Actual Coating Weight (grams/ sq. meter) |
|---|---|---|
| 52.5 | .28 | 0 |
| 28.2 | .55 | 1.8 |
| 21.8 | .66 | 2.5 |
| 11.0 | .96 | 4.2 |
| 8.5 | 1.07 | 5.0 |
| 5.1 | 1.29 | 6.2 |
| 2.7 | 1.57 | 8.2 |
| 2.4 | 1.62 | 8.8 |

The straight line of FIGURE 2 was then used to determine the coating weights of an arbitrary group of film samples coated with various amounts of the previously-described dispersion. Light transmissions were measured and translated into coating weights by FIGURE 2 (the optical density method). The coating weights were also determined by the manual procedure previously described (the direct weight method). The values obtained are compared in Table 2. It will be observed that the values for each sample differ from each other by an average of only ±0.1 gram/square meter.

Table 2

COATING WEIGHT DETERMINATION

| Sample | Direct weight method (gms./ square meter) | Optical density method (gms./ square meter) |
|---|---|---|
| A | 5.9 | 5.8 |
| B | 6.1 | 6.0 |
| C | 5.8 | 5.7 |
| D | 7.7 | 7.5 |
| E | 7.9 | 7.9 |

EXAMPLE II

A coating composition was prepared following the procedure described in Example I from the following ingredients:

|  | Parts |
|---|---|
| Primary dispersing agent | 1 |
| "Duponol" WAQ | 1.0 |
| Vinyl chloride | 94 |
| Methyl acrylate | 6 |
| Itaconic acid | 1 |
| Catalyzing agent | 0.378 |
| Ammonium persulfate | 0.250 |
| Meta-sodium bisulfite | 0.125 |
| Ferrous ammonium sulfate | 0.003 |
| Secondary dispersing agent | 3.4 |
| "Duponol" WAQ | 1.0 |
| Santomerse 3 [1] | 2.0 |
| "Daxad" 11 | 0.4 |
| Water | 105 |

[1] Sodium dodecyl benzene sulfonate.

The dispersion, containing 50% solids, was coated on a regenerated cellulose film approximately 0.0012" thick in the manner described in Example I. The percentage of dispersant-ultraviolet light absorbent compound used was 2.4%; 0.4% of "Daxad" 11 and 2.0% of Santomerse 3. Portions of the dispersion were diluted and applied to other film samples. Optical densities using light at a wave length of 254 millimicrons and the actual coating weights were both determined as in Example I. The values are presented in Table 3 and plotted in FIGURE 3.

Table 3
VALUES SERVING AS A BASIS FOR FIGURE 3

| Light transmitted (percent) | Optical density $\left(-\log \frac{L.T.}{100}\right)$ | Actual coating weight (grams/sq. meter) |
|---|---|---|
| 65.2 | .185 | 3.1 |
| 64.9 | .188 | 3.7 |
| 63.2 | .198 | 4.3 |
| 61.5 | .211 | 5.2 |

FIGURE 3 was then utilized to determine coating weights of an arbitrary group of coated film samples by merely measuring light transmission through the coated film samples. These values are compared to the actual coating weights in Table 4. Again, an average difference of only ±0.1 gram/square meter was observed.

Table 4
COATING WEIGHT DETERMINATION

| Sample | Direct weight method (grams/sq. meter) | Optical density method (grams/sq meter) |
|---|---|---|
| A | 5.6 | 5.6 |
| B | 5.6 | 5.8 |
| C | 5.3 | 5.2 |
| D | 6.3 | 6.1 |

As many widely different embodiments can be made without departing from the spirit and scope of this invention, it is understood that the invention is not limited except as defined in the appended claims.

I claim:

1. A method for measuring the weight of coating on a base film which comprises uniformly coating a base film selected from the group consisting of regenerated cellulose, polyvinyl chloride, polyethylene, vinylidene chloride copolymer, polyvinyl fluoride and alkyl acrylate polymers with a dispersion of a vinylidene chloride polymer dispersed in water with a dispersing agent for said vinylidene chloride polymer, said dispersion containing a measured amount of at least one dispersing compound selected from the group consisting of alkali metal and ammonium salts of sulfonic acids of aromatic compounds and alkali metal and ammonium salts of sulfonic acids of condensed aromatic compounds as part of the dispersing agent for said vinylidene chloride polymer, said dispersing compound being capable of absorbing ultraviolet light having a wave length of 220–400 millimicrons; and, thereafter, subjecting the coated film to ultraviolet light having a wave length of 220–400 millimicrons and measuring the amount of said light transmitted through the coated film.

2. A method as in claim 1 wherein said dispersing compound is condensed sodium naphthalene sulfonate.

3. A method as in claim 1 wherein said dispersing compound is a sodium alkyl benzene sulfonate.

4. A method as in claim 1 wherein the ultraviolet light has a wave length of 220–270 millimicrons.

5. A method as in claim 1 wherein the base film is regenerated cellulose film.

6. A method for measuring the weight of coating on regenerated cellulose film which comprises uniformly coating the regenerated cellulose film with a dispersion containing a copolymer of at least 80% vinylidene chloride and 3–20% of at least one other polymerizable mono-olefinic monomer copolymerizable with vinylidene chloride dispersed in water with a dispersing agent for said copolymer, said dispersion containing a measured amount of at least 0.1%, based on the weight of the copolymer, of at least one dispersing compound selected from the group consisting of alkali metal and ammonium salts of sulfonic acids of aromatic compounds and alkali metal and ammonium salts of sulfonic acids of condensed aromatic compounds as part of the dispersing agent for said copolymer, said dispersing compound being capable of absorbing ultraviolet light having a wave length of 220–400 millimicrons; and, thereafter, subjecting the coated film to ultraviolet light having a wave length of 220–400 millimicrons and measuring the amount of said light transmitted through the coated film.

7. A method as in claim 6 wherein said dispersing compound is condensed sodium naphthalene sulfonate.

8. A method as in claim 6 wherein said dispersing compound is a sodium alkyl benzene sulfonate.

9. A method as in claim 6 wherein the ultraviolet light has a wave length of 220–270 millimicrons.

10. A method for measuring the weight of coating on regenerated cellulose film which comprises uniformly coating the regenerated cellulose film with a dispersion containing a copolymer of at least 80% vinylidene chloride and 3–20% of at least one other polymerizable mono-olefinic monomer copolymerizable with vinylidene chloride dispersed in water with a dispersing agent for said copolymer, said dispersion containing a measured amount of 0.1–6%, based on the weight of the copolymer, of at least one dispersing compound selected from the group consisting of sodium salts of sulfonic acids of aromatic compounds and sodium salts of sulfonic acids of condensed aromatic compounds as part of the dispersing agent for said copolymer, said dispersing compound being capable of absorbing ultraviolet light having a wave length of 220–400 millimicrons; and, thereafter, subjecting the coated film to ultraviolet light having a wave length of 220–400 millimicrons and measuring the amount of said light transmitted through the coated film.

References Cited in the file of this patent

UNITED STATES PATENTS

| | | |
|---|---|---|
| 1,930,666 | Schwalbe et al. | Oct. 17, 1933 |
| 2,109,235 | Kott | Feb. 22, 1938 |
| 2,129,131 | Hunter | Sept. 6, 1938 |
| 2,129,132 | Hunter | Sept. 6, 1938 |
| 2,171,427 | Eggert et al. | Aug. 29, 1939 |
| 2,222,532 | Eggert et al. | Nov. 19, 1940 |
| 2,320,842 | Arnold et al. | June 1, 1943 |
| 2,350,001 | Van Den Akker | May 30, 1944 |
| 2,364,112 | Van Every | Dec. 5, 1944 |
| 2,423,774 | Heigl | July 8, 1947 |
| 2,470,341 | Darrah | May 17, 1949 |
| 2,541,167 | Pitzl | Feb. 13, 1951 |
| 2,580,461 | Pearl | Jan. 1, 1952 |
| 2,614,940 | Freyermuth et al. | Oct. 21, 1952 |
| 2,617,940 | Giguere | Nov. 11, 1952 |
| 2,631,243 | Weber et al. | Mar. 10, 1953 |
| 2,638,656 | Tuffle et al. | May 19, 1953 |
| 2,797,171 | Fralish | June 25, 1957 |
| 2,898,800 | Bergson | Aug. 11, 1959 |
| 2,910,385 | Berry et al. | Oct. 27, 1959 |
| 2,918,578 | Friedman | Dec. 22, 1959 |
| 2,934,647 | Blake | Apr. 26, 1960 |
| 2,936,732 | Ring et al. | May 17, 1960 |
| 2,950,218 | Covington et al. | Aug. 23, 1960 |
| 2,951,416 | Shinn | Sept. 6, 1960 |
| 2,961,340 | Meier | Nov. 22, 1960 |

FOREIGN PATENTS

| | | |
|---|---|---|
| 690,696 | Great Britain | Apr. 29, 1953 |